United States Patent [19]

Conroy

[11] Patent Number: 5,012,408
[45] Date of Patent: Apr. 30, 1991

[54] MEMORY ARRAY ADDRESSING SYSTEM FOR COMPUTER SYSTEMS WITH MULTIPLE MEMORY ARRAYS

[75] Inventor: David G. Conroy, Maynard, Mass.

[73] Assignee: Digital Equipment Corporation, Maynard, Mass.

[21] Appl. No.: 494,780

[22] Filed: Mar. 15, 1990

[51] Int. Cl.⁵ .................................................. G06F 13/00
[52] U.S. Cl. ................................. 364/200; 364/243; 364/245; 364/245.31; 364/246.9; 364/964; 364/970.5; 365/230.03
[58] Field of Search .......................... 364/200, 900; 365/230.03

[56] References Cited

U.S. PATENT DOCUMENTS

| | | | |
|---|---|---|---|
| 3,872,452 | 3/1975 | Stoops | 340/173 R |
| 4,266,285 | 5/1981 | Panepinto, Jr. | 365/189 |
| 4,281,392 | 7/1981 | Grants et al. | 364/900 |
| 4,303,993 | 12/1981 | Panepinto, Jr. et al. | 365/230 |
| 4,354,258 | 10/1982 | Sato | 365/230 |
| 4,400,794 | 8/1983 | Koos | 364/900 |
| 4,566,082 | 1/1986 | Anderson | 365/230 |
| 4,675,808 | 6/1987 | Grinn et al. | 364/200 |
| 4,760,522 | 7/1988 | Weatherford et al. | 364/200 |
| 4,768,148 | 8/1988 | Keeley et al. | 364/200 |
| 4,785,395 | 11/1988 | Keeley | 364/200 |
| 4,787,060 | 11/1988 | Boudreau et al. | 364/200 |
| 4,809,234 | 2/1989 | Kuwashiro | 365/230 |
| 4,813,014 | 3/1989 | DeBell | 365/45 |
| 4,833,601 | 5/1989 | Barlow et al. | 364/200 |
| 4,860,252 | 8/1989 | Sykora | 364/900 |
| 4,943,966 | 7/1990 | Giunta et al. | 371/11.1 |
| 4,951,248 | 8/1990 | Lynch | 364/900 |

Primary Examiner—Michael R. Fleming
Assistant Examiner—Glenn A. Auve
Attorney, Agent, or Firm—Flehr, Hohbach, Test, Albritton & Herbert

[57] ABSTRACT

A computer system has a set of memory module slots, each of which may receive a memory module or may be left empty. The memory slots are arranged to accept at least two different types of memory modules having different amounts of memory storage. Each type of memory module generates a module type signal which denotes the type of the module and thus the amount of memory storage in the module. Whenever the system is powered on or reset, the system's memory initialization software analyzes the module type signals generated by the memory modules which are installed in memory slots. Each memory module is assigned a physical address range based solely on the size of the memory module and the slot in which it is located, regardless of what other memory modules are being used. The computer system thereby determines which portions of the computer's address space will be used for primary memory. The computer system is a multitasking computer system which has a virtual memory management system. Once the addresses occupied by memory modules have been identified, the primary memory is divided into a set of pages. The usage of these pages are governed by the computer system's virtual memory management system, which guarantees that all memory references to primary memory will reference only addresses in the aforementioned set of pages.

8 Claims, 4 Drawing Sheets

PRIOR ART

MEMORY ARRAY ADDRESSING SYSTEM FOR COMPUTER SYSTEMS WITH MULTIPLE MEMORY ARRAYS

The present invention relates generally to the memory subsystems of computer systems, and particularly to methods and systems for accessing multiple memory arrays of differing sizes.

BACKGROUND OF THE INVENTION

The present invention concerns the ability of computer users to increase the amount of high speed random access memory (RAM) used in a particular computer system. In particular, many computers are designed so that it is relatively easy to increase the amount of RAM which is installed in the computer. Typically, at least in "workstation" computers, it is common to provide a set of memory slots, into each of which can be inserted an additional memory module. Thus, if there are say, eight memory slots, each of which accepts a one-megabyte memory module, the computer can be set up with anywhere from one to eight megabytes of memory, depending on the user's needs and financial resources.

A new layer of complexity can be added to the above described "memory slot" scheme. In particular, several or all of the slots can be designed to accept memory modules of differing sizes. For instance, each memory slot can be designed to accept memory modules which contain either one megabyte of RAM or four megabytes of RAM.

There are at least two very good reasons for providing memory slots which can be used with memory modules of two or more sizes. First, it allows for a much broader range of memory sizes to be used with the same computer, without unduly increasing the number of memory module slots that have to be provided. For instance, a single computer can allow for a minimum memory configuration of eight megabytes and a maximum of 256 megabytes by providing just eight memory module slots, each of which can accept either 8 Megabyte or 32 Megabyte memory modules, instead of having to provide thirty-two memory slots, each of which can accept only 8 Megabyte memory modules.

Second, it allows the computer manufacturer to enable the use of higher density memory modules than those which are currently available. For instance, while memory modules using 1 Megabit dynamic RAM chips are commonly available at the time that this patent application is being filed (early in 1990), memory modules using 4 Megabyte dynamic RAM chips will soon be available and modules using 16 Megabyte RAM chips will be probably be available in a few years. Thus the trend toward increasing memory densities can be anticipated by computer manufacturers by providing memory module slots which will allow the use of higher density memory modules than those which are available at the time that the computer is designed or manufactured.

This brings us to the problem which is the subject of the present invention. In particular, how are physical addresses to be assigned to each of the memory modules in the computer if the sizes of the memory modules in the module slots are not predefined (i.e., the sizes are unknown before the computer is turned on)? In many computer systems, it is assumed that the portion of the computer's address space assigned to primary memory (random access memory) is contiguous—i.e., in these systems there are no unused addresses between the addresses assigned to the memory modules.

It should be noted that the memory which is being assigned to a contiguous range of address values in these systems is herein called "primary memory". Primary memory does not include image buffers, read only memory, and the like, which are typically assigned predefined address ranges that are not available to the memory modules used for primary memory.

There are several ways that prior art systems handle the problem of assigning addresses to memory modules. One way is to put on each memory module a set of switches which control how the memory in the module will be addressed by the system. For instance, many IBM PC compatible computers use this approach. Whenever a new memory module is installed in such a system, a person must figure out how to arrange the memory modules into a legal configuration. The person then sets the configuration switches on the memory module and installs the memory module in the proper place in the computer.

Another prior art method of dealing with this problem is to replace the person and the configuration switches with some digital logic. In some systems the allocation of memory arrays is done completely with hardware and in some systems it is partially accomplished with software. In either case, the computer determines the sizes of the memory modules in its various slots, and then assigns address ranges to each module so that the memory modules occupy a contiguous section of the computer's address space. This process is generally performed by the computer whenever the computer is turned on or restarted, and the computed address values are then stored in an address decoder or similar circuit in the computer's memory management system.

Thus, such prior art computer systems require programmable address decoders, and special routines for determining what address ranges are to be assigned to each memory module. Furthermore, due to the basic addressing requirements of many such computers, there are often limitations on the mixtures of memory modules which can be used, and which memory module slots those modules must be placed in. In other words, the user must find the right reference manual and must faithfully follow the instructions in that manual in order to be able to add memory to the computer.

SUMMARY OF THE INVENTION

In comparison with the prior art systems described above, the present invention provides a much simpler system for allocating physical addresses to memory modules which may vary in size. In particular, each memory module is assigned a physical address range based solely on the size of the memory module and the slot in which it is located, regardless of what other memory modules are being used. This simple address assignment scheme is made possible by exploiting the basic abilities of multitasking operating systems to maintain maps of physical memory for the purpose of allocating memory to user processes. Furthermore, the present invention enables a user to add memory to the system by inserting one or more memory modules into any of the available memory module slots, without regard to the size or type of the memory modules used.

In accordance with the present invention, a computer system is provided with a series of memory module slots, each of which may receive a memory module or may be left empty. The memory slots are arranged to accept at least two different types of memory modules having different amounts of memory storage. Each type of memory module generates a distinct module type signal which denotes the type or size of that module.

Whenever the system is powered on or reset, the system's initialization software analyzes the module type signals generated by the memory modules which are installed in memory slots. Each memory module is assigned a physical address range based solely on the size of the memory module and the slot in which it is located, regardless of what other memory modules are being used. The computer system thereby determines which portions of the computer's address space will be used for primary memory.

The computer system of the present invention is a multitasking computer system which has a virtual memory management system. Once the addresses occupied by memory modules have been identified, the primary memory is divided into a set of pages. The usage of these pages are governed by the computer system's virtual memory management system. As is standard, normal operation of the virtual memory management system guarantees that all memory references to primary memory will reference only addresses in the aforementioned set of pages.

BRIEF DESCRIPTION OF THE DRAWINGS

Additional objects and features of the invention will be more readily apparent from the following detailed description and appended claims when taken in conjunction with the drawings, in which:

FIG. 3 is a block diagram of a virtual memory manager and the pages of memory which the manager keeps track of.

DESCRIPTION OF THE PREFERRED EMBODIMENT

Figure 1:
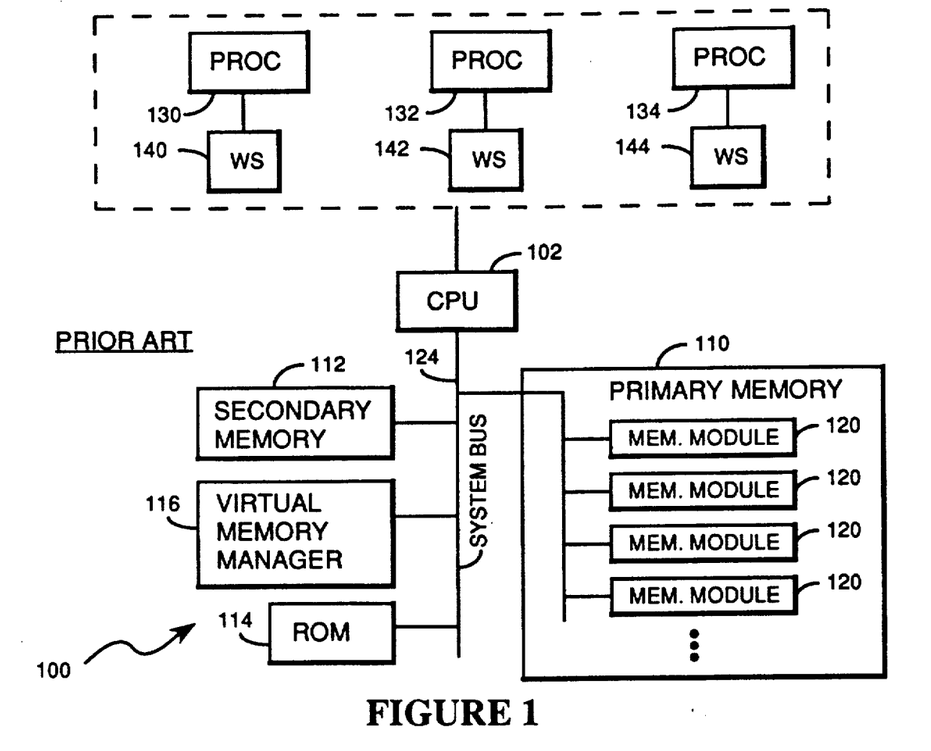
FIG. 1 is a block diagram of a multitasking computer system.

Referring to FIG. 1, there is shown a block diagram of a standard multitasking computer system 100. The system 100 includes a central processing unit (CPU) 102, primary memory 110, secondary memory 112, read only memory (ROM) 114 and a virtual memory manager 116 (also called the virtual memory management system). The primary memory 110 contains one or more modules 120 of high speed random access memory (RAM). The secondary memory 112 typically contains one or more magnetic or optical disk drives and is used for storing software and data not currently being used or stored in primary memory 110. Read only memory 114 is used to store portions of the computer's operating system. The above mentioned memory subsystems are coupled to the CPU 102 by the system bus 124, which includes an address bus, data bus and control bus (not shown).

VIRTUAL MEMORY MANAGEMENT SYSTEM.

The present invention can be viewed as an improvement or a new feature which can be used with prior art computer systems that have a virtual memory management system. It is beyond the scope of the present invention to describe virtual memory management techniques in any detail. However, for the benefit of those unfamiliar with virtual memory management, the following short discussion is provided.

Virtual memory management systems are generally used in multitasking computer systems—which means that the computer system can simultaneously run a number of different processes 130-134. Each process 130, 132 or 134 is assigned a working set 140, 142 or 144, which comprises a portion of the primary memory.

Figure 2:
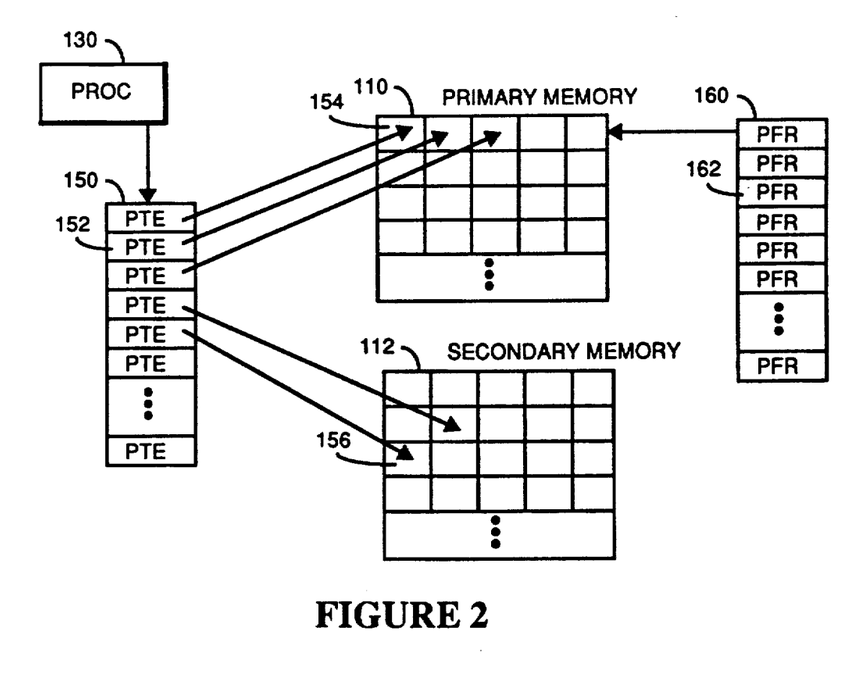
FIG. 2 is a block diagram of the virtual pages associated with a process and the corresponding physical pages in primary and secondary memory.

Referring to FIG. 2, in a virtual memory system, both physical (i.e., primary and secondary) memory and virtual memory are divided into equally sized pages. For example, each page may contain 4096 bytes of data. Furthermore, each process 130 run by the computer 100 is given a virtual memory space that is segmented into pages. All of the virtual pages of a particular process 130 which are currently stored in primary memory are called the working set 140 of the process. Thus each process 130-134 has an associated working set 140-144.

For each process 130 running in the computer system, the memory manager 116 uses a page table 150 to keep track of the virtual memory pages used by that process 130. The page table 150 for any one process 130 contains many "page table entries" in (PTEs) 152, each of which denotes the location and status of one page in the process's virtual memory space. For each virtual page of the process which is stored in primary memory 110, the page table 150 will contain a PTE which points to a page 154 in the primary memory in which that virtual page is stored. Similarly, for each virtual page stored in secondary memory 112, the page table 150 will contain a PTE which points to a page 156 in the secondary memory in which that virtual page is stored.

Since a process typically uses many pages of memory there will be a corresponding number of PTEs 152. These PTEs are stored in an array (i.e., table) 150 which is itself stored in primary memory 110.

Another data structure used by the virtual memory management system is a page frame record array 160. The page frame record array 160 contains a page frame record (PFR) 162 for each page 154 in primary memory. The PFR 162 for a primary memory page denotes the status of the page (e.g., whether it is allocated to a process, whether it is available for allocation to a process, etc.).

Figure 3:
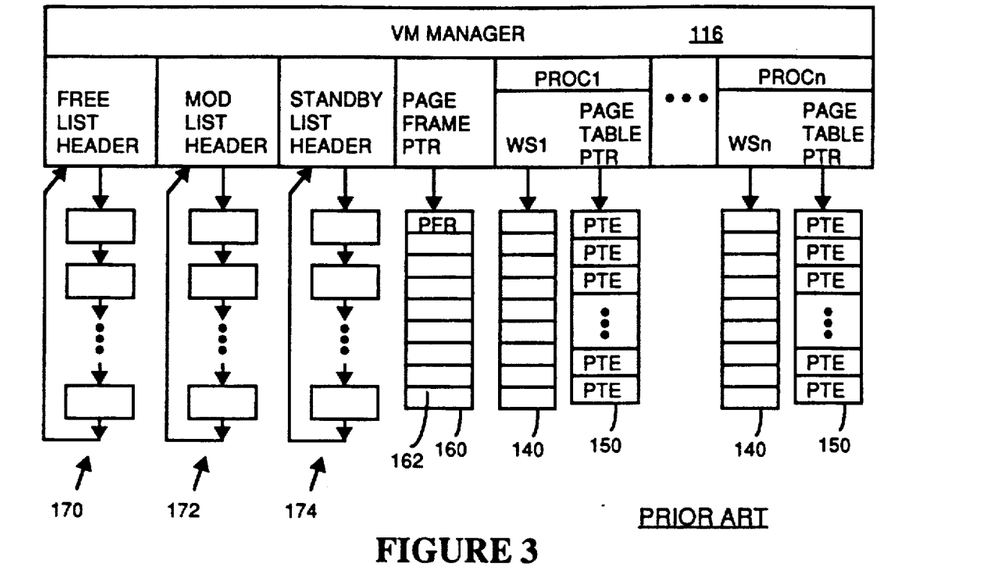

Referring to FIG. 3, the virtual memory manager 116 can be thought of as a special set of software and data arrays for keeping track of how the primary and secondary memory are being used by the various processes running in the computer system. For each process, the virtual memory manager 116 maintains a page table 150 and a working set list 140. It also maintains a single page frame record array 160, as described above. Furthermore, pointers to pages in primary memory which are not currently allocated to a process, or which are in the process of being copied into secondary memory before being made available for allocation to a process, are maintained on a number of linked lists 170-174. A free list 170 lists all the primary memory pages available for allocation to processes. A modified list 172 lists primary memory pages that have been modified and need to be copied to secondary memory before being made available for allocation to a different process than the process to which it is currently allocated. A standby list 174 lists primary memory pages, the contents of which have not been modified, and which are available for re-use. A number of additional page lists not relevant here are maintained by the virtual memory manager 116. It may be noted that all of these lists 170-174 comprise linked lists of page frame records 162 from the page frame record array 160.

With regard to the present invention, the only relevant feature of the virtual memory management system is that virtual memory manager ensures that all memory references (i.e., read or write operations to memory) made by the computer system are directed to a page in primary memory. If a process tries to access a virtual memory page that is not currently stored in primary memory, a memory fault occurs. The fault is resolved by copying the virtual memory page into a page of primary memory and then resuming the process which caused the fault.

Furthermore, all primary memory pages used by a process are allocated from the lists 170-174 maintained by the virtual memory manager. Essentially a page in primary memory is allocated and reallocated as needed. Primary memory pages are therefore treated as a finite, reusable resource. Therefore, once all of the primary memory pages which are physically present in the system have been identified and denoted in the virtual memory management system's lists and arrays, only pages which are physically present will be referenced by the computer.

As can be seen from the above discussion, when using a multitasking computer with a virtual memory management system, there is no need for all of primary memory to be in contiguous portions of the computer's address space. The reason for this is that the virtual memory management system will automatically map all virtual memory references into the available pages of primary memory, regardless of where those pages happen to be located in the computer's address space.

MEMORY MODULE ADDRESS ALLOCATION

Figure 4:
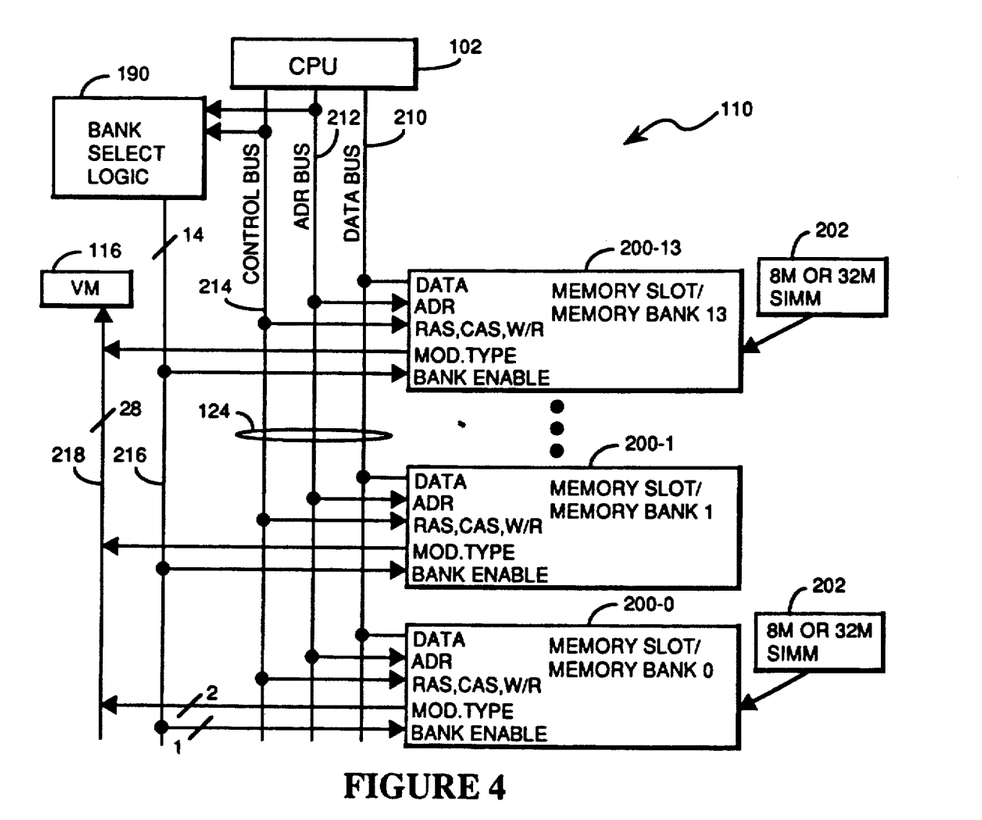
FIG. 4 is a block diagram of a primary memory system in accordance with the present invention.

Referring to FIG. 4, the primary memory system 110 in the preferred embodiment includes a bank select logic circuit 190, and fourteen memory module slots 200-0 through 200-13. Each memory module slot 200 is designed to accept either of two types of memory modules 202: one memory module type which has 8 Megabytes of memory storage, and a second type which has 32 Megabytes of memory storage.

The preferred embodiment is designed to accept two sizes of memory modules, 8 Megabytes and 32 Megabytes. Allowing the use of two sizes of memory modules allows for a much broader range of memory sizes to be used with the same computer than if only a single size of memory module were allowed. In the preferred embodiment, a single computer can allow for a minimum memory configuration of 8 Megabytes and a maximum of 448 Megabytes by providing fourteen memory module slots, each of which can accept either 8 Megabyte or 32 Megabyte memory modules, instead of having to provide fifty-six memory slots, each of which can accept only 8 Megabyte memory modules.

Using dual capacity memory module slots also allows the computer manufacturer to enable the use of higher density memory modules than those which are currently available. For instance, while memory modules using 1 Megabit dynamic RAM chips are commonly available at the time that this patent application is being filed, it is expected that memory modules using 4 Megabyte dynamic RAM chips will soon be available.

Each memory module slot 200 has a data port coupled to the computer system's data bus 210, an address port coupled to the computer system's address bus 212, and a control signal port coupled to the computer system's control bus 214. In addition, each memory module slot 200 receives a distinct binary bank enable signal transmitted over line 216 by the bank select logic 190 to the memory module slot 200.

The system determines what type of memory module 202, if any, is coupled to (i.e., inserted in) each memory module slot 200 as follows. Each memory module slot 200 generates a two bit signal called "Mod.Type". If there is no memory module in the slot, Mod.Type is equal to "00". If an 8 Megabyte memory module is inserted in the slot, Mod.Type is equal to "01"; and if a 32 Megabyte memory module is inserted in the slot, Mod.Type is equal to "10". All the Mod.Type signals from the fourteen memory module slots 200 are transmitted to the virtual memory management system 116 on bus 218.

The address space of the computer system is assumed to range from 0 to 1024M - 1 (i.e., from 0 to FFF FFFFF in hexadecimal notation). Table 1 shows the portion of this address space assigned to each memory module 202 in the primary memory system 110. As can be seen from Table 1, each memory module is assigned a physical address range based solely on the size of the memory module and the slot in which it is located, regardless of what other memory modules are being used.

Figure 5:
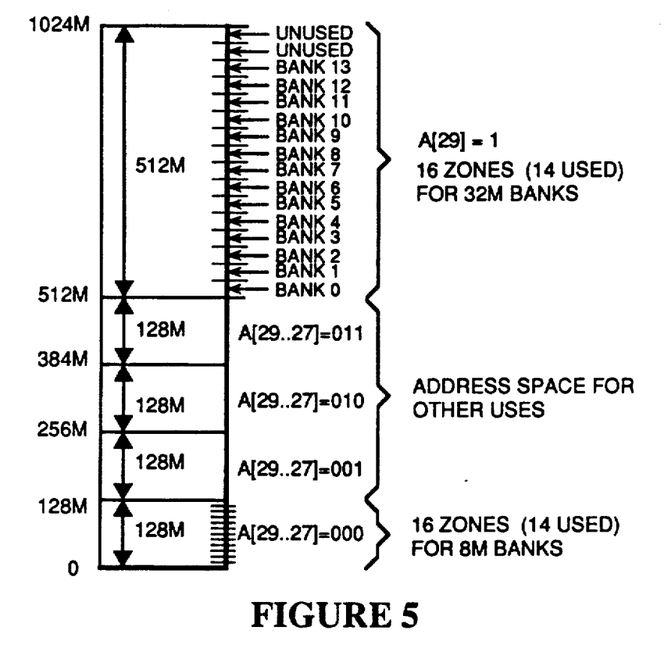
FIG. 5 is a map of the address space of a computer in the preferred embodiment of the present invention.

To access an address range of 0 to 1024 Megabytes, the address bus 212 carries or transmits thirty binary address signals, herein labelled A[29...0], where A[29] is the most significant address bit and A[0] is the least significant address bit. Using this address signal notation, FIG. 5 shows a map of the address space of this computer system. As shown, the first 128 Megabytes of address space (0 to 128M) are reserved for 8 Megabyte memory modules and the last 512 Megabytes of address space (512M to 1024M) are reserved for 32 Megabyte memory modules. The remaining portions of the address space are used for read only memory, input and output devices, and so on.

TABLE 1

| MEMORY SLOT ADDRESS ASSIGNMENTS | | | | |
|---|---|---|---|---|
| MEMORY SLOT | 8M START ADDRESS | 8M END ADDRESS | 32M START ADDRESS | 32M END ADDRESS |
| 0** | 000 00000 | 007 FFFFF | 200 00000 | 21F FFFFF |
| 1 | 008 00000 | 00F FFFFF | 220 00000 | 23F FFFFF |
| 2 | 010 00000 | 017 FFFFF | 240 00000 | 25F FFFFF |
| 3 | 018 00000 | 01F FFFFF | 260 00000 | 27F FFFFF |
| 4 | 020 00000 | 027 FFFFF | 280 00000 | 29F FFFFF |
| 5 | 028 00000 | 02F FFFFF | 2A0 00000 | 2BF FFFFF |
| 6 | 030 00000 | 037 FFFFF | 2C0 00000 | 2DF FFFFF |
| 7 | 038 00000 | 03F FFFFF | 2E0 00000 | 2FF FFFFF |
| 8 | 040 00000 | 047 FFFFF | 300 00000 | 31F FFFFF |
| 9 | 048 00000 | 04F FFFFF | 320 00000 | 33F FFFFF |
| A | 050 00000 | 057 FFFFF | 340 00000 | 35F FFFFF |

TABLE 1-continued

| | MEMORY SLOT ADDRESS ASSIGNMENTS | | | |
|---|---|---|---|---|
| MEMORY SLOT | 8M START ADDRESS | 8M END ADDRESS | 32M START ADDRESS | 32M END ADDRESS |
| B | 058 00000 | 05F FFFFF | 360 00000 | 37F FFFFF |
| C | 060 00000 | 067 FFFFF | 380 00000 | 39F FFFFF |
| D | 068 00000 | 06F FFFFF | 3A0 00000 | 3BF FFFFF |
| E* | 070 00000 | 077 FFFFF | 3C0 00000 | 3DF FFFFF |
| F* | 078 00000 | 07F FFFFF | 3E0 00000 | 3FF FFFFF |

*Not used in the preferred embodiment.
**When a 32 Megabyte memory module is used in slot 0, the first 8 Megabytes are actually accessed at addresses 0 through 007 FFFFF, and the remaining 24 Megabytes are accessed at addresses 208 00000 through 21F 00000.

As can be determined by simple division, there is room in the address space for sixteen 8 Megabyte modules in the address space between 0 and 128M, and there is room for sixteen 32 Megabyte modules in the address space between 512M and 1024M. Since the preferred embodiment provides for only fourteen memory module slots, two of the available "slots" in each of these address space ranges is unused in the preferred embodiment.

It may also be noted that, in the preferred embodiment the operating system of the computer requires that certain portions of the operating system be stored in predefined addresses which are located between 0 and 1 Megabyte. Many computer operating system have similar requirements. Therefore, when a 32 Megabyte memory module is used in slot 0, the first 8 Megabytes of that module are actually accessed at addresses 0 through 007 FFFFF, and the remaining 24 Megabytes are accessed at addresses 208 00000 through 21F 00000.

Next, we will explain how the memory address space allocation described above is implemented in the preferred embodiment. The implementation has two aspects: address decoding during operation of the computer, and initialization of the virtual memory manager's lists whenever the computer is powered on or reset.

Figure 6:
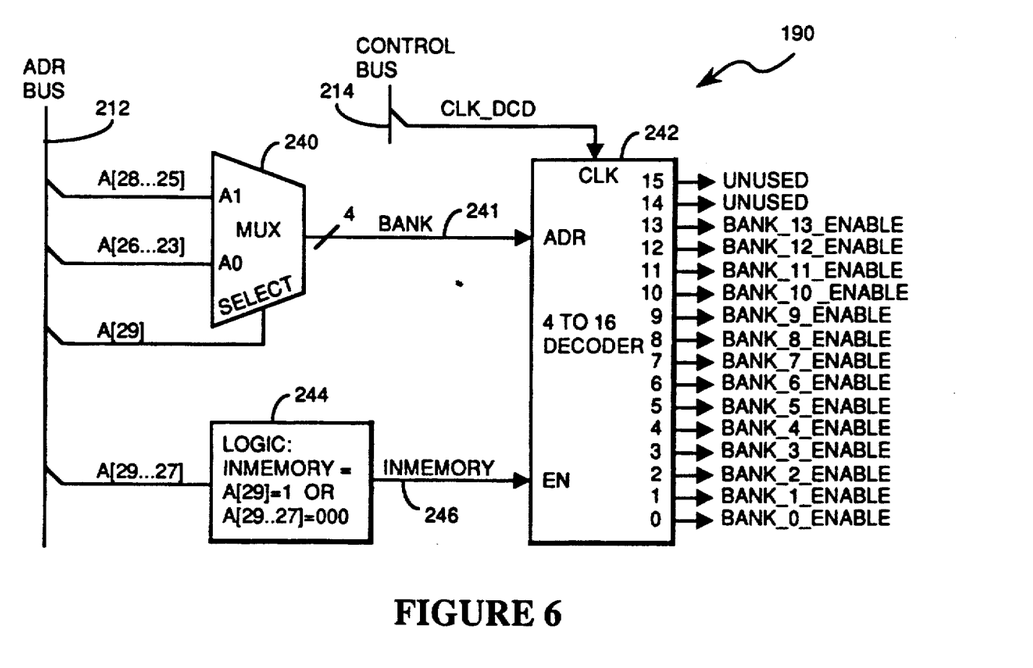
FIG. 6 is a diagram of the bank selection circuitry used in the preferred embodiment of the present invention.

Referring to FIGS. 5 and 6, the bank select logic circuit 190 works as follows. Multiplexer 240 is used to select one of two sets of address signals: A[28 . . . 25] or A[26 . . . 23]. Address signals A[28 . . . 25] are sent on line 241 to decoder 242 if A[29]=1, which means that the upper half of the computer's address space is being accessed. If the lower half of the computer's address space is being accessed (as indicated by A[29]=0) address signal A[26 . . . 23] are sent to decoder 242.

From the address space diagram in FIG. 5, it can be seen than whenever address signal A[29]=1, the location being accessed is in the address space zone or region for 32 Megabyte memory modules. Therefore, when A[29]=1, the next four most significant address signals A[28 . . . 25] are decoded by decoder 252 to select the proper memory module.

When A[29]=0, the computer is accessing a location in the lower half of the computer's address space, and it can be seen that the address space zone for 8 Megabyte memory modules corresponds to A[29 . . . 27]=000. Therefore, when A[29 . . . 27]=000, the next four most significant address signals A[26 . . . 23] are decoded to select the proper memory module.

An additional logic circuit 244 generates a decoder enable signal called INMEMORY on line 246 if either A[29]=1 or A[29 . . . 27]=000. The INMEMORY signal is coupled to the enable port of the decoder 242. Operation of the decoder 242 is enabled only if the INMEMORY signal is enabled.

Decoder 242 decodes the four bit address signal received from multiplexer 240 and generates sixteen bank enable signals, two of which are unused. The fourteen bank enable signals which are used are labelled BANK_0_ENABLE through BANK_13_ENABLE. Referring to FIG. 4, each of these bank enable signals is transmitted by the bank select logic circuit 190 via bus 216 to a corresponding one of the fourteen memory module slots 200-0 through 200-13. If the INMEMORY signal is not enabled, none of the outputs of the decoder 242 are enabled and therefore none of the memory modules will be enabled.

One additional feature of the decoder 242 is that it is a clocked decoder circuit. The decoder 242 reads in the address signals to be decoded in accordance with a clock signal labelled in FIG. 6 as CLK_DCD. This clock signal occurs one clock cycle before the address control signal used with dynamic memory circuit (RAS) is transmitted, enabling propagation of the decoded memory bank signals before the next memory access cycle is executed.

Figure 7:
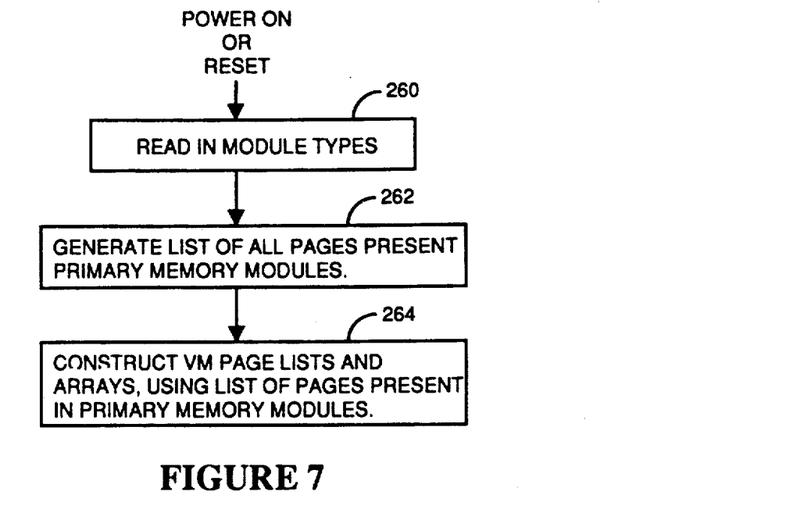
FIG. 7 is a flow diagram of the memory address allocation process used by the present invention whenever the computer is powered on or reset.

Referring to FIGS. 4 and 7, we will now explain how the virtual memory manager's lists are initialized whenever the computer is powered on or reset. As shown in FIG. 4, all the Mod.Type signals from the fourteen memory module slots 200 are transmitted to the virtual memory management system 116 on bus 218. The module type signals Mod.Type are read by the virtual memory manager 116 whenever the computer is powered on or reset as part of the computer system's initialization process (step 260 in FIG. 7).

These module type signals specify all of the memory modules which have been coupled to the system. That is, these signals denote the type (8 Megabyte, 32 Megabyte or empty) of the memory module in each memory module slot. Using the memory map in FIG. 5 or the address ranges listed in Table 1, it is a simple matter to construct a list of all the primary memory pages which are physically present in the system (step 262).

In addition, the virtual memory manager generates the lists and arrays needed for memory management (step 264) some of which were described above with reference to FIG. 3. One part of that process is to generate page frame records for all of the primary memory pages present in the system (i.e., in memory modules 202). All of the pages of primary memory which are used to store portions of the operating system that cannot be swapped out to secondary memory are so marked in their PFR's 162 (see FIGS. 2 and 3), and all other pages in primary memory are added to the free list 170 (shown in FIG. 3) so as to make them available for use by the various processes run by the computer system.

In conclusion, when using a multitasking computer with a virtual memory management system, there is no need for all of primary memory to be in contiguous portions of the computer's address space. The virtual memory management system automatically maps all virtual memory references into the available pages of primary memory, regardless of where those pages happen to be located in the computer's address space.

ALTERNATE EMBODIMENTS

As can be seen from FIG. 5 and Table 1, even though there is no need for memory modules to be assigned contiguous address ranges, the addressing scheme of the preferred embodiment is designed to make it possible to minimize the number of discontinuities in the memory map. That is, if the computer's primary memory is populated with only 8 Megabyte memory modules, it is possible to put all the modules in neighboring slots and thereby keep all of primary memory in a contiguous portion of the address space. If the computer's primary memory is populated with some 8 Megabyte memory modules and some 32 Megabyte memory modules, it is possible to have all of the 8 Megabyte memory modules in one contiguous zone and all the 32 Megabyte memory modules in a second contiguous zone so that there is only one "break" in the addresses for primary memory.

Of course, the present invention allows the memory modules used to populate primary memory to be randomly placed in the memory module slots 200. However, there are some computer programs or processes which require the use of contiguous memory addresses, and therefore it is sometimes advantageous to have relatively large blocks of contiguous primary memory.

When the minimum memory modules are quite large (such as the 8 Megabytes modules in the preferred embodiment), enabling memory modules to occupy contiguous address ranges may not be important. In addition, if the computer must be able to accept more than two different memory modules sizes, it may not be possible to assign each memory module size a distinct address range. In such systems, a single predefined starting address can be assigned to each memory module slot. The minimum differential between the starting address of two memory modules slots will equal to the size of the largest modules that can be used by the computer system.

For example, if this alternate memory module address assignment scheme were applied to the preferred embodiment described above, the memory module assignment table would as shown in Table 2.

TABLE 2

| \multicolumn{5}{c}{ALTERNATE MEMORY SLOT ADDRESS ASSIGNMENTS} |
| MEMORY SLOT | 8M START ADDRESS | 8M END ADDRESS | 32M START ADDRESS | 32M END ADDRESS |
| --- | --- | --- | --- | --- |
| 0 | 000 00000 | 007 FFFFF | 000 00000 | 01F FFFFF |
| 1 | 220 00000 | 227 FFFFF | 220 00000 | 23F FFFFF |
| 2 | 240 00000 | 247 FFFFF | 240 00000 | 25F FFFFF |
| 3 | 260 00000 | 267 FFFFF | 260 00000 | 27F FFFFF |
| 4 | 280 00000 | 287 FFFFF | 280 00000 | 29F FFFFF |
| 5 | 2A0 00000 | 2A7 FFFFF | 2A0 00000 | 2BF FFFFF |
| 6 | 2C0 00000 | 2C7 FFFFF | 2C0 00000 | 2DF FFFFF |
| 7 | 2E0 00000 | 2E7 FFFFF | 2E0 00000 | 2FF FFFFF |
| 8 | 300 00000 | 307 FFFFF | 300 00000 | 31F FFFFF |
| 9 | 320 00000 | 327 FFFFF | 320 00000 | 33F FFFFF |
| A | 340 00000 | 347 FFFFF | 340 00000 | 35F FFFFF |
| B | 360 00000 | 367 FFFFF | 360 00000 | 37F FFFFF |
| C | 380 00000 | 387 FFFFF | 380 00000 | 39F FFFFF |
| D | 3A0 00000 | 3A7 FFFFF | 3A0 00000 | 3BF FFFFF |
| E* | 3C0 00000 | 3C7 FFFFF | 3C0 00000 | 3DF FFFFF |
| F* | 3E0 00000 | 3E7 FFFFF | 3E0 00000 | 3FF FFFFF |

*Not used in the preferred embodiment.

Figure 8:
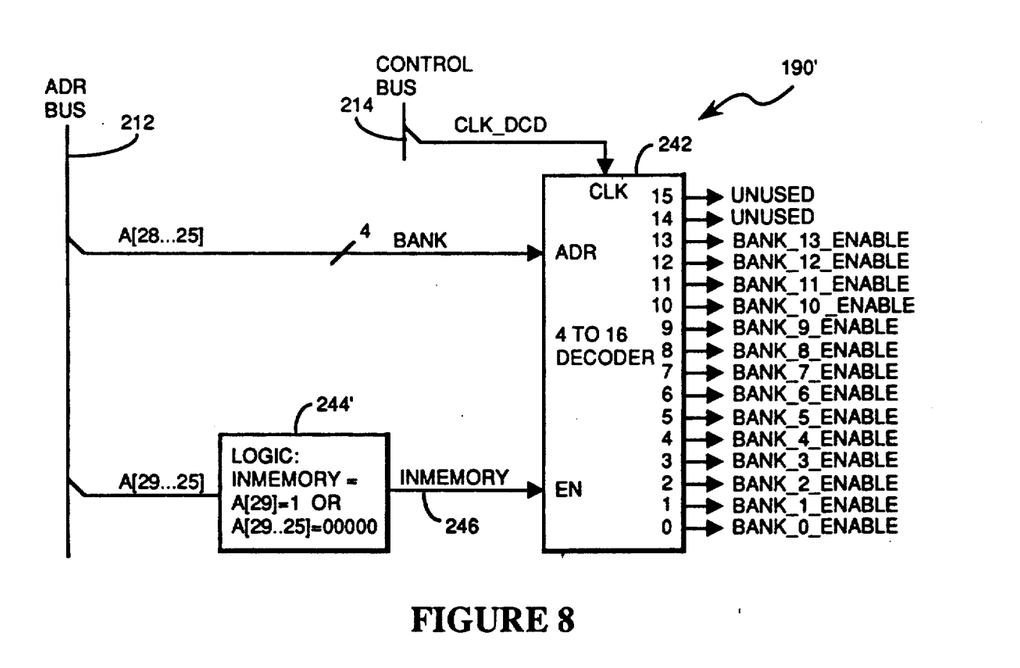
FIG. 8 is a diagram of an alternate embodiment of the bank selection circuitry used in the present invention.

Referring to FIG. 8, the bank selection logic circuit 190' for this alternate memory module address assignment scheme is also somewhat simpler than the one for the preferred embodiment, because the multiplexer 242 of the preferred embodiment can be eliminated. As will be understood by those skilled in the art, the decoder enable logic circuit 244' is slightly modified, in addition, because the portion of the lower half of the address space allocated to primary memory is only 32 Megabytes, instead of 128 Megabytes. As can be seen in Table 2, when using 8 Megabyte memory modules, the address ranges of the memory modules are not contiguous, even if neighboring memory module slots are used. In accordance with the present invention, the computer system's performance is not hurt by the fact that address ranges used by primary memory are not contiguous.

Furthermore, regardless of whether the bank select logic circuit is implemented as in FIG. 6 or as in FIG. 8, the present invention provides a simple and versatile system for allocating addresses to memory modules which virtually eliminates the possibility of a user making an error when installing additional memory. The present invention also eliminates much of the complexity associated with prior art systems for adding memory or memory modules to a computer system.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer memory system, comprising:

address bus means for transmitting sets of address signals, each set of address signals defining an address in a predefined address space;

a plurality of memory module slot means, coupled to said address bus means, for receiving memory modules; each memory module slot means including means for receiving a corresponding memory module enable signal; at least one of said memory module slot means including means for receiving at least two different types of memory modules having differing amounts of memory storage;

memory management means, coupled to said plurality of memory module slot means, for assigning an address range to each memory module slot means solely on the basis of a type of memory module, if any, inserted therein, each said assigned address range being independent of which type of memory modules, if any, are inserted in other ones of said memory module slot means; and decoder means coupled to said address bus means and said plurality of memory module slot means, for decoding each said set of address signals, and for generating a memory module enable signal corresponding to one of said memory module slot means whenever said set of address signals define an address in one of said predefined address ranges assigned to said plurality of memory module slot means;

wherein each said memory module slot means has a fixed, predefined address range assigned thereto for each different type of memory module which it has means for receiving, and said assigned address ranges for memory module slot means with memory modules inserted therein need not be contiguous;

whereby memory modules can be inserted in any selected ones of said memory module slot means without regard to the corresponding address ranges assigned thereto.

2. The computer memory system set forth in claim 1, further including at least one memory module inserted into one of said memory module slot means.

3. The computer memory system set forth in claim 1, further including:

at least one memory module, each memory module inserted into one of said memory module slot means and each including means for generating a module type signal denoting the type of said memory module and amount of memory storage in said memory module;

said memory management means receiving said module type signal for each said memory module, and determining the predefined address range corresponding to said at least one memory module.

4. The computer memory system set forth in claim 1, further including:

at least one memory module, each memory module inserted into one of said memory module slot means and each including means for generating a module type signal denoting the type of said memory module and amount of memory storage in said memory module; each said memory module storing data at specified memory locations within said predefined address range assigned to said memory module slot to which said memory module is coupled;

said memory management means receiving said module type signal for each said memory module, determining the predefined address range corresponding to said at least one memory module, and enabling access only to memory locations within said predefined address ranges corresponding to said at least one memory module.

5. The computer memory system set forth in claim 1, further including;

at least one memory module, each memory module inserted into one of said memory module slot means and each including means for generating a module type signal denoting the type of said memory module and amount of memory storage in said memory module; each said memory module storing data at specified memory locations within said predefined address range assigned to said memory module slot to which said memory module is coupled;

said memory management means receiving said module type signal for each said memory module, determined a predefined address range corresponding to said at least one memory module, denoting lists of pages of predetermined size within each of said predefined address ranges corresponding to said at least one memory module, and enabling access only to memory locations within said pages denoted in said lists; whereby said memory management means prevents access to memory locations not occupied by memory modules.

6. A method of accessing data storage locations in a computer memory system, said computer memory system including an address bus for transmitting sets of address signals, each set of address signals defining an address in a predefined address space, and a plurality of memory module slots, coupled to said address bus, with memory modules inserted in at least two of said memory module slots; a plurality of said memory module slots including means for receiving at least two different types of memory modules having differing amounts of memory storage;

the steps of the method comprising:

assigning a predefined address range to each memory module slot solely on the basis of a type of memory module, if any, inserted therein, each assigned predefined address range being independent of which type of memory module, if any, are inserted in other ones of said memory module slots;

receiving sets of address signals transmitted on said address bus; and decoding each said set of address signals, and generating a memory module enable signal corresponding to one of said memory module slot means whenever said set of address signals define an address in one of said predefined address ranges assigned to said plurality of memory module slots;

wherein each said memory module slot has a fixed, predefined address range assigned thereto for each different type of memory module which it has means for receiving, and said assigned address ranges for memory module slots with memory modules inserted therein need not be contiguous;

whereby memory modules can be inserted in any selected ones of said memory module slots without regard to corresponding address ranges assigned thereto.

7. The method of accessing data storage locations in a computer memory system set forth in claim 6, including:

generating a module type signal denoting the type of each said memory module and an amount of memory storage in said memory module; and receiving said module type signal for each said memory module, determining the predefined address range corresponding to said received module type signal for each said memory module, and enabling access only to memory locations within said predefined address ranges corresponding to said memory modules.

8. The method of accessing data storage locations in a computer memory system set forth in claim 6, including:

generating a module type signal denoting the type of each said memory module and an amount of memory storage in said memory module;

receiving said module type signals for each said memory module and determining the predefined address range corresponding to said received module type signal for each said memory module; and denoting lists of pages of predetermined size within each of said predefined address ranges corresponding to said memory modules, and enabling access only to memory locations within said pages denoted in said lists; whereby access to memory locations not occupied by memory modules is prevented.

* * * * *